Feb. 13, 1962    N. N. ESTES    3,021,482
ELECTRICAL READOUT INTEGRATOR
Filed Nov. 28, 1958

INVENTOR.
NELSON N. ESTES.
BY *John F. Hohmann*

United States Patent Office 3,021,482
Patented Feb. 13, 1962

3,021,482
ELECTRICAL READOUT INTEGRATOR
Nelson N. Estes, Austin, Tex., assignor to Union Carbide Corporation, a corporation of New York
Filed Nov. 28, 1958, Ser. No. 777,009
4 Claims. (Cl. 324—94)

This invention relates to an electrical readout integrator.

A family of electrochemical devices in which a number of different effects are achieved by the movement of ions in solution has recently attracted favorable attention. These devices have come to be known as "solions." They are discussed in some detail in the literature: Journal of the Electrochemical Society, vol. 104, No. 12 (December 1957); Yale Scientific Magazine, vol. XXXII, No. 5 (February 1958) and Electronics Products Engineering Bulletin No. 1, published November 1957, by National Carbon Company, 30 East 42nd Street, New York 17, New York.

One solion device which has been developed is called an "integrator." It has the ability, by measuring the transfer of ions, to indicate the integral of a current applied to it over a period of time. One type of integrator is provided with electrodes so that its signal can be read electricity. It is termed an electrical readout integrator. It is this type with which the present invention is concerned.

An electrical readout integrator is a solion consisting of a cell containing as electrolyte a solution of a reversible redox system, the solution being divided into three zones of different concentrations of a measured species of such system, all zones being electrically connected through the electrolyte. One of the three zones, called the "integral" zone is of variable concentration. Another zone, high in concentration of the measured species, is called the "reservoir" zone. Between the integral zone and the reservoir zone is a zone low in concentration of measured species.

There is a tendency for diffusion of species to occur from one zone to the other due to the differences in concentration therein. Such diffusion is detrimental for it affects the accuracy of integration.

It is the principal object of the present invention to provide an improved electrical readout integrator. More specifically, it is an object of the invention to provide such an integrator in which the tendency for diffusion of species from one zone to another is minimized.

Figure 1:
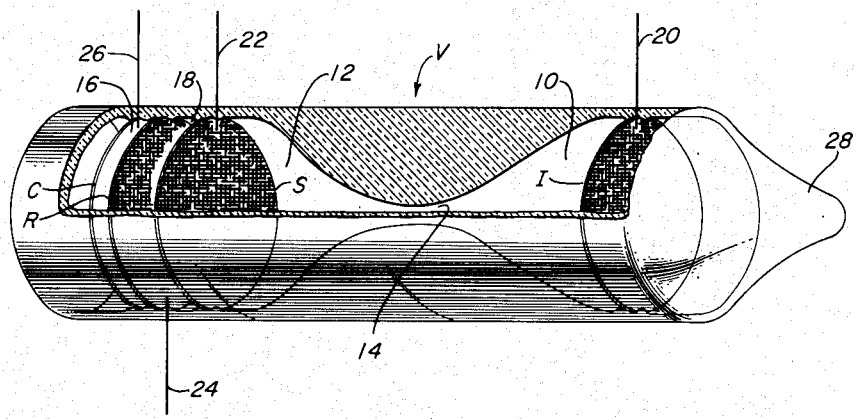
Figure 2:
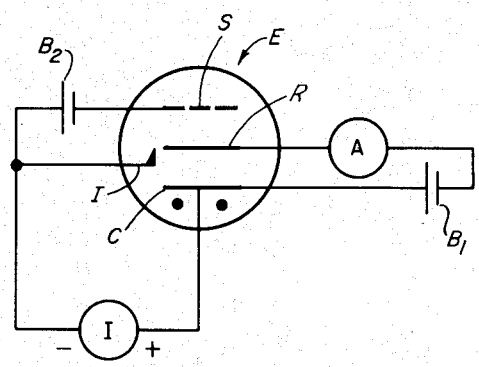

In the accompanying drawing:

FIG. 1 is a perspective view, part being broken away, of an electrical readout integrator embodying the invention; and FIG. 2 is a diagrammatic representation of an electrical readout integrator.

The invention is an electrical readout integrator in which, in addition to properly biased electrodes in different zones of concentration, a barrier in the form of a capillary is provided which minimizes diffusion effects between concentration zones.

More specifically, and with reference to FIG. 1, the invention is an electrical readout integrator comprising a vessel V having two compartments 10, 12 connected by a capillary 14. The vessel V contains a solution of a conventional reversible redox system as electrolyte and electrical connection between the two compartments 10, 12 is maintained by such electrolyte. One compartment 10 contains an electrode referred to as an input electrode I. Here the concentration of measured species is high. In the other compartment 12 are provided a common electrode C, so-called because it is common to the input to the integrator and the readout therefrom, a readout electrode R, and a shield electrode S, so-called because it tends to prevent undesired passage of species of the redox system. Between the common electrode C and the readout electrode R is a zone 16 of variable concentration. This is the "integral" zone. The concentration of measured species in the zone 18 between the readout electrode R and the shield electrode S is dilute. Suitable leads 20, 22, 24, 26 are applied to the input electrode I, the shield electrode S, the readout electrode R and the common electrode C respectively. Conveniently the leads 20, 22, 24, 26 are in planes about 90° apart for ease of connection thereto. The vessel V is filled during manufacture through one end which is later sealed as shown at 28.

Reference to the circuit diagram of FIG. 2 will show the biasing circuit applied to the readout electrode R and the common electrode C of an integrator E from a battery $B_1$, the circuit including a suitable ammeter. It will be noted that the electrode R is negative to the common electrode C. A similar bias circuit is provided between the shield electrode S and the input electrode I, the former being negative with respect to the latter. The voltage for this circuit is supplied by a battery $B_2$. As shown, a source of input current is applied between the electrodes I and C, the latter being made positive.

The operation of an electrical readout integrator embodying the invention will be described with particular reference to one using a solution of an electrolyte containing the iodide-iodine system in which iodine is the measured species although it will be understood that the invention is not limited to use with that particular system. In that system, potassium iodide and iodine are usually dissolved in an alcohol-water mixture.

When a bias voltage is supplied to the readout electrode R and the common electrode C from the battery $B_1$ the current reading of the ammeter will be a measure of the iodine concentration in the integral zone. Since the iodine concentration is directly related to the integral of the input current to the integrator E, the ammeter can be directly calibrated in microcoulombs. At the readout electrode R iodine is reduced to iodide while at the common electrode C iodide is oxidized to iodine. Both of these reactions take place in the integral zone 16 between the readout electrode R and the common electrode C and there is therefore no net change in the iodine concentration in the integral zone 16. It is thus possible to have a continuous electrical readout while integration of the input current to the integrator is still taking place.

The current to be integrated is applied to the integrator E through the input electrode I and the common electrode C. As stated it causes an increase in iodine concentration in the integral zone 16. This zone is very small relative to the reservoir zone by reason of very close placement of the readout electrode R and common electrode C with respect to each other. This enables the iodine generated at the common electrode C to diffuse rapidly through the solution in the integral zone 16. Diffusion of iodine from the reservoir zone is minimized by the capillary 14. Should any iodine escape past the capillary 14, the shield electrode S, being biased negatively as above described, will reduce it. Thus the capillary 14 and shield electrode S so operate to insure accuracy of the integrator.

With regard to materials of construction for the integrator of the invention, glass is most convenient for fabrication of the vessel V. Other materials inert to the electrolyte solution may be used if desired. The electrodes are preferably composed of platinum, suitably platinum gauze although apertured plates may be used. It is necessary that a number of passages be present through the electrodes but the passages must be small.

Instead of platinum other inert, impervious materials may be used, for example, iridium, palladium, or rhodium or alloys with each other or with platinum. Electrodes having a surface of pyrolitic carbon may also be used. Other suitable redox systems include the ferrocyanide-ferricyanide system and cerous-ceric ion system. The selected electrolyte is dissolved in a solvent which must dissolve the measured species and permit one of the species to become ionized. Suitable solvents include methanol, ethanol, amyl alcohol, butyl alcohol, and water. Usually alcohol-water mixtures are best.

In making the integrators embodying the invention, it is convenient to assemble them in glass tubing. The electrodes are firmly sealed to the walls of the tubing and the capillary is formed in place. After all electrodes are in place, the electrolyte solution is added, and the tube is sealed. Cleanliness is most important.

A large number of integrators embodying the invention have been made using an electrolyte solution of 0.025 N iodine and 0.5 N potassium iodide dissolved in a methyl alcohol-water mixture containing 25% methyl alcohol by volume. Many of this type have been assembled in glass tubing of about ¼ inch diameter. The entire integrator does not exceed about ½ inch in some cases. Larger sizes can, of course, be made if desired.

Integrators embodying the invention have been used successfully in a number of circuits including the amplifiers described in applications of N. N. Estes and J. J. Moore, Ser. No. 777,095, and Ser. No. 777,010, both filed concurrently herewith and issued on March 14, 1961, as U.S. Patent No. 2,975,374 and U.S. Patent No. 2,975,373 respectively. They have also been used with equal success in time base generators such as those described in application Ser. No. 777,011 filed concurrently herewith by N. N. Estes and J. J. Moore.

In the iodine-iodide system with platinum electrodes the voltage across any of the electrodes should not exceed about 0.9 volt for above that voltage hydrogen is evolved irreversibly. The integrator can be used for integrating currents at higher voltages by reducing their voltage to 0.9 volt or below.

Other uses and modifications of the integrator of the invention within its scope will occur to those skilled in the art.

I claim:
1. An electrical readout integrator comprising a vessel containing a solution of an electrolyte comprising a reversible redox system, said vessel having two compartments connected by a capillary, said compartment being physically and electrically connected by said electrolyte within said capillary, an input electrode in one of said compartments and, in the other of said compartments a shield electrode adjacent to said capillary, a common electrode, and a readout electrode between said shield electrode and said common electrode, the concentration of a measured species being high in said compartment containing said input electrode, variable in said other compartment between said common electrode and said readout electrode and low between said shield electrode and said readout electrode, said capillary acting to prevent diffusion of said measured species from said first compartment to said other compartment and said shield electrode acting to convert any measured species passing through said capillary to unmeasured species whereby to prevent variation of concentration of measured species between said readout electrode and said common electrode by diffusion, said shield electrode being biased negative with respect to said input electrodes, and said readout electrode being biased negative with respect to said common electrode, said readout electrode and said common electrode being provided with leads for connection to a meter.

2. An integrator as defined by claim 1 in which said electrodes are apertured.

3. An integrator as defined by claim 2 in which said electrodes are platinum.

4. An integrator as defined by claim 3 in which said redox system is iodine-iodide and said measured species thereof is iodine.

References Cited in the file of this patent

UNITED STATES PATENTS

| | | |
|---|---|---|
| 2,411,089 | Fredericks | Nov. 12, 1946 |
| 2,685,025 | Root | July 27, 1954 |
| 2,890,414 | Snavely | June 9, 1959 |

OTHER REFERENCES

Publication: "Low Power Electrochemical Control Devices," by Hurd and Lane in the Journal of Electrochemical Society, vol. 104, No. 12, December 1957, pages 727–730.

UNITED STATES PATENT OFFICE

CERTIFICATE OF CORRECTION

Patent No. 3,021,482                      February 13, 1962

Nelson N. Estes

It is hereby certified that error appears in the above numbered patent requiring correction and that the said Letters Patent should read as corrected below.

Column 1, line 26, for "electricity" read -- electrically --.

Signed and sealed this 11th day of September 1962.

(SEAL)
Attest:

ERNEST W. SWIDER                      DAVID L. LADD
Attesting Officer                         Commissioner of Patents